Feb. 16, 1965 W. J. BARTIK ETAL 3,170,147

MAGNETIC CORE MEMORY

Filed Aug. 17, 1959 2 Sheets-Sheet 1

INVENTORS.
W. J. BARTIK
K. GRUENSFELDER

BY Milton C. Jacobs

ATTORNEY

MAGNETIC CORE MEMORY

Filed Aug. 17, 1959 2 Sheets-Sheet 2

INVENTORS
W. J. BARTIK
K. GRUENSFELDER
BY [signature]
ATTORNEY

3,170,147
MAGNETIC CORE MEMORY

William J. Bartik, Hatboro, and Kurt Gruensfelder, Ambler, Pa., assignors to Sperry Rand Corporation, New York, N.Y., a corporation of Delaware
Filed Aug. 17, 1959, Ser. No. 834,275
19 Claims. (Cl. 340—174)

This invention relates to information storage systems employing magnetic cores. Such systems are commonly used to store information in electronic computers and the like. The magnetic cores used in such systems are characterized by exhibiting certain hysteresis characteristics which enable them to assume two stable states of magnetization. The preferred hysteresis characteristic is rectangular. Through the use of suitable circuitry, selected cores in a system may be driven to saturation in one of two regions of the hysteresis loop and they will remain in that region until switched to the other region. Such cores are therefore useful for the stable storage of binary numbers.

In practice, magnetic core storage systems may take many different forms. Often for ease of design and for spatial considerations, the cores are arranged in the form of a matrix. There are several systems available for putting information into such a matrix and reading information out of the same. Among these may be mentioned coincident current systems, wherein selecting lines traverse the cores in two or more directions and wherein each such selecting line may carry a certain fraction of the current necessary to switch the cores, whence it becomes necessary for a plurality of such lines to be simultaneously excited in order to switch a given core. Other systems include core-diode selection schemes.

When it is considered that many thousands of cores may be linked by each selecting line in a matrix (in one case 3000 cores for a selecting line linking several planes), it is evident that certain design problems will arise. On considering a single selecting line with its windings linking a line of cores, it is seen to comprise a large number of inductive elements, having more or less equal inductance and being more or less evenly distributed. Such a single selecting line will also have more or less equal distributed capacitance to ground and to other lines. A single selecting line may be considered in a way similar to a transmission line. In the usual core memory application this selecting line is short circuited at one end and a current source is connected to the other end. The application of current in the form of a step function to the selecting line results in oscillations in said line.

The present invention is concerned with apparatus for applying a constant current drive without oscillations to a memory line in a core storage array while minimizing current consumption during steady state conditions.

Accordingly, an object of the invention is the provision of improved apparatus for damping a memory line in a magnetic core storage memory.

Another object is to provide a new and improved magnetic core storage memory system.

Another object is to provide improved apparatus for driving a memory line in a magnetic core storage array wherein constant current amplitude without oscillations is obtained when the driving current has risen to its final value.

A further object of the invention is the provision of improved apparatus whereby the foregoing objectives are attained with reduced consumption of power following arrival at the steady state condition.

A still further object of the invention is the provision of improved apparatus in which the means for damping oscillations in a memory line consumes power only during the time in which the driving current is rising or falling to its final value.

Other objects and advantages will appear as this description proceeds.

Briefly, the invention lies in provision of apparatus for driving a memory line in a magnetic core storage array in which a means is provided for absorbing current reflections and for maintaining current amplitude at a constant value without oscillations when its desired value has been reached, which absorbing means absorbs very little power during steady state conditions. This absorbing means, in some forms of the invention, is responsive only during current rise or fall periods and in some forms is placed in parallel with the memory line.

The foregoing objects, advantages and description of the invention will become more readily apparent in the following description and drawings in which like reference characters refer to like components and in which:

FIGURE 1 is a schematic circuit diagram of a magnetic core storage array embodying the present invention;

FIGURE 1*a* is a schematic circuit diagram of one of the switching lines of FIGURE 1;

FIGURE 1*b* is a schematic circuit diagram of an alternative embodiment of the driving means which may be used in the array of FIGURE 1;

Figure 1:
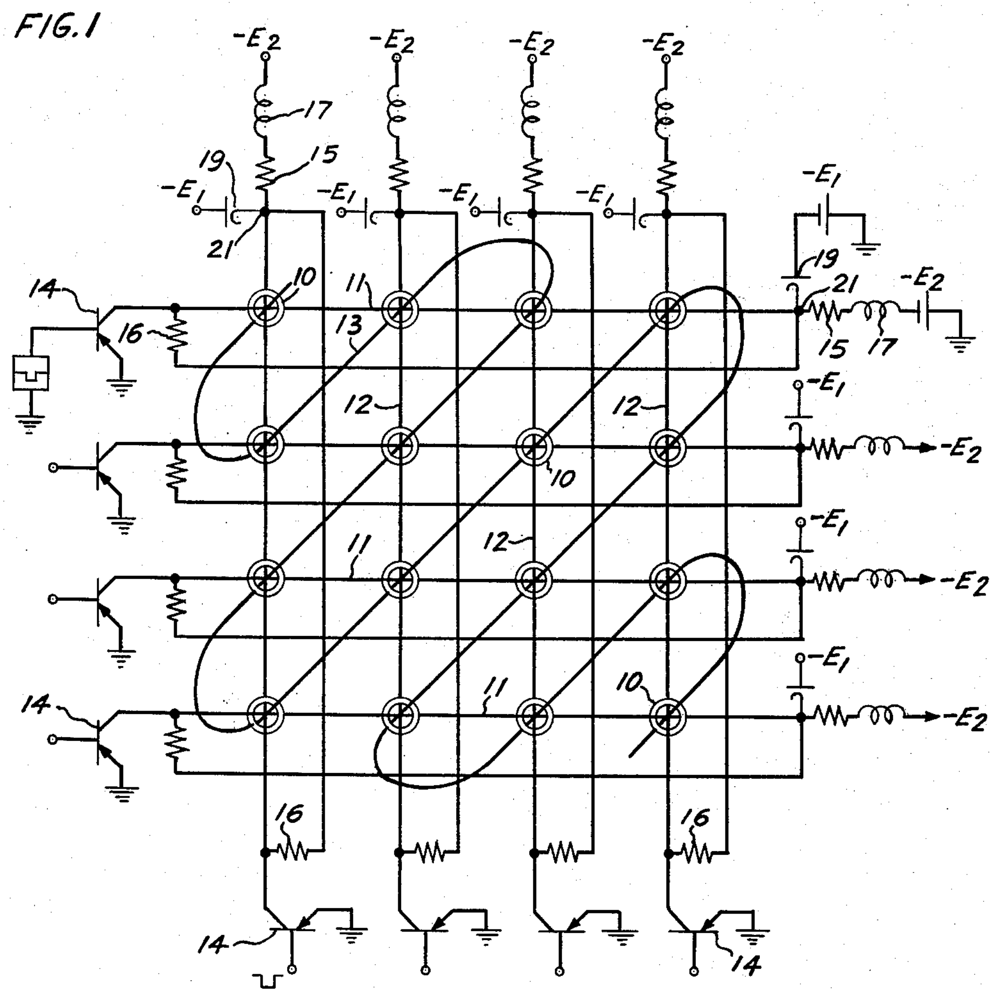

In the circuit of FIGURE 1, a magnetic core storage device includes a plurality of magnetic cores 10 arranged in the form of a matrix with selecting lines 11 and 12 respectively linking the cores in the rows and columns of the matrix. A line 13 links all of the cores and may be used to obtain information readout from the matrix. The cores are characterized by exhibiting substantially rectangular hysteresis loops. Opposite magnetic states may be used to store binary digits. Only sixteen cores are shown in FIGURE 1 for simplicity of illustration. However, in practice, hundreds or thousands of cores may be linked by each selecting line.

Each of the horizontal selecting lines 11 and vertical selecting lines 12 has one end thereof connected to the collector of a PNP transistor switch 14. Each emitter is connected to ground and each base to a source of negative going signal pulses. The other end 21 of each selecting line is connected to a potential source $-E_2$ by way of resistor 15 and inductor 17 and connected to a potential source $-E_1$ (more positive than $-E_2$) by way of a diode 19. Connected in parallel with each of the selecting lines between the collector of transistor switch 14 and the terminal 21 is a resistor 16.

Initially, all cores may be assumed to be in one remanent state. It is possible to switch one core to the opposite remanent state by applying to one of the row lines 11 and to one of the column lines 12 half of the current required for switching the core. A magnetizing force equal to or greater than the coercive force will be applied to the one core at the intersection of the energized row line and column line whereupon that core will be switched to the opposite state of magnetization. Various arrangements such as additional drive lines (not shown) well-known in the art may be used to restore the cores to their initial state, thus it is possible to supply binary digital information to the matrix of cores and to determine uniquely the storage address of such binary information.

Considering now the operation of the circuit of FIGURE 1 in detail, let us assume it is desired to switch a core 10 in a top left hand corner of the matrix to a state opposite from a presumed initial state. Negative going signals will be simultaneously applied to the bases of the transistors 14 located respectively in the top row and the left hand column of the matrix. Such signals have the effect of making their respective transistors conductive whereby the ends of the respective switching lines are placed at ground potential. The other ends of these switching lines are normally clamped at a potential $-E_1$ by the diode 19 connected to source $-E_1$. During quiescent conditions a current will flow from source $-E_1$ through diode 19 thence through resistor 15 and inductor 17 to the potential source $-E_2$. The effect of connecting the opposite ends of the respective switching lines to ground via the switching transistors 14 is to cause a current flow from ground through the respective selecting lines to the terminals 21 thereby cutting off diode 19. Due to the impedance of the resistor-inductor combination 15, 17 being relatively large compared to that of the selecting line, very little more current can flow than normally flows during quiescent conditions. It is evident, therefore, that the circuit including diode 19, resistor 15 and inductor 17 will be effective to provide for substantially constant current in each of the switching lines. With simultaneous current flowing through the top row switching line and the left hand column switching line wherein the current in each case is equal to half the current required to turn over the core to its opposite magnetic state it is evident that the full switching current will be applied and the core switched accordingly.

A memory line may have a terminating impedance other than its characteristic impedance so that applied pulses will be reflected back to the input end of the line and oscillations will occur. Impedances equivalent to the characteristic impedance of the memory lines may be connected in series with switching lines linking the memory cores and with the drivers therefor in order to prevent reflections and thereby maintain constant values. Such an arrangement for damping suffers from the serious disadvantage of consuming considerable power during steady state conditions.

Figure 1A:
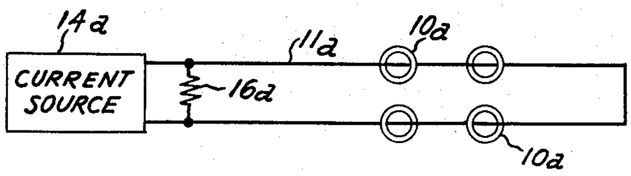

The provision of damping resistors 16 which are made respectively equal to the characteristic impedances of each of the switching lines ensures that in such lines there will be no overshoots of current. In the FIGURE 1 embodiment of the invention these characteristic impedances as represented by resistors 16 are connected in parallel with the lines at the driving ends of the respective lines. Referring to FIGURE 1*a* there is shown a diagrammatic representation of one switching line such as is to be found in FIGURE 1. The application of a current pulse thereto by high impedance source **14*a* results in the current dividing so that part of the current travels along the line 11*a* and part is shunted through the resistance 16*a*. When the pulse reaches the end of the line remote from the source 14*a* it will be reflected back towards the source at an increased amplitude. The impedance of the current source 14*a* looking back is high (effectively that of the resistor-inductor 15, 17), and the resistance of resistor 16*a* is substantially equal to the characteristic impedance of the line which is much lower. Therefore, this reflected wave will be completely absorbed in the resistor 16*a***, and oscillations in the line will cease. Thus, only a single reflection occurs, and the selecting line quickly assumes a steady state condition.

In this form of the invention, when steady state conditions have been reached, power is dissipated in damping resistors connected in parallel, that is, across the selecting lines. However, much less power will be dissipated than in the case of a damping resistor connected in a series circuit with the switching line and driving transistor 14.

If, for example, one were to consider a set of idealized parameters one might assume a characteristic impedance of 100 ohms for a switching line. If now under maximum loading conditions one half ampere of current flow is required through the switching line, then it is evident that during steady state conditions the power dissipated by a resistor equal to the characteristic impedance when placed in series with the line would be equal to $I^2R=25$ watts. In the present invention, however, the terminating resistor is placed in parallel with the line so that assuming further that the resistance of the switching line were to be held to 10 ohms as is practical, the other parameters remaining the same, it is evident that now current flow through the damping resistor 16 during steady state will be 1/20 of an ampere and power dissipation thereby will be reduced to ¼ watt.

Thus, with this invention, although one reflection occurs, increasing slightly the time to reach steady state, there is no seriously deleterious effect on the operation of the memory. However, there is a substantial improvement in the steady state power dissipation. Notwithstanding this one reflection, there are no overshoots in the waveform of the applied pulse, but, rather, during the pulse, a substantially constant current is maintained.

Figure 1B:
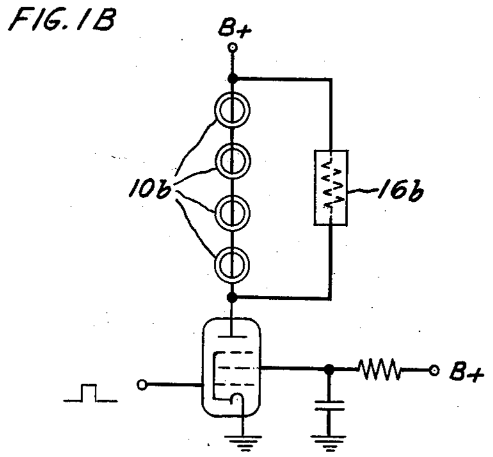

FIGURE 1*b* shows one memory line only of a memory matrix such as depicted in FIGURE 1 the circuit being otherwise similar thereto. (Parts corrsponding to those previously described are referenced with the same numerals with the addition of the letter *b*.) In FIGURE 1*b* a conventional pentode circuit P is shown for applying current pulses to the line in place of the transistor switches shown in FIGURE 1. A resistance element **16*b*** of substantially characteristic impedance is connected in parallel to the selecting line and operates to terminate the memory lines in a manner similar to that described above.

It is evident that various other sources of driving current for switching means might be employed for the switching lines of FIGURES 1 and 1*a*, and accordingly, there is no intention to limit the invention to these actual types. For example, magnetic amplifiers just as readily may be used in place of the pentode switching means or the transistor switching means.

In the circuit of FIGURE 2 again a single memory line only is shown which comprises a plurality of cores 20 linked by a conductor 22 and energized from a current source 24. In this form of the invention a resistor 28 of characteristic impedance is also placed in parallel with the switching line 22. Herein, however, this resistor is connected by means of a capacitor 26 connected in series therewith.

In operation, the application of a current pulse to the switching line again causes one reflection to occur in the line in a manner similar to that described above. When the reflected waves arrives at the source, in view of its transient nature, it will be passed through the capacitor 26 and subsequently absorbed by resistor 28 of characteristic impedance. Since a capacitor will not pass steady state current, it is evident that as soon as the steady state condition has been reached, no further power will be dissipated.

Figure 3:
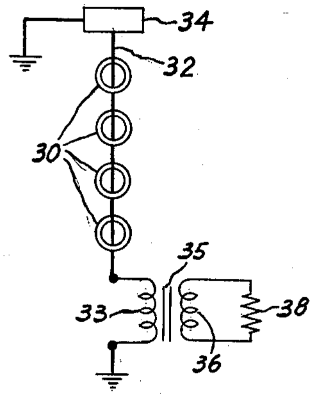
FIGURE 3 is a schematic circuit diagram of apparatus for forming the third embodiment of the invention.

Another arrangement of apparatus for the damping of a memory line will be seen in considering FIGURE 3. The memory line shown in FIGURE 3 is similar to that described above and includes a plurality of cores 30 linked by a selecting conductor 32 and is energized from a current source 34. Connected in series with the line 32 is the primary 33 of a linear transformer 35 across the secondary of which is connected a resistor 38 equal in resistance to the characteristic impedance of the line. As current is established in the line 32, a voltage is induced in the secondary 36 of the transformer 35 and the resistor 38 across the secondary damps the array thereby preventing reflections along the memory line. As soon as steady state conditions are reached the transformer primary winding has negligible impedance and no power is transferred to the secondary. This transformer effectively connects the damping resistor in series with the line 32 during transient conditions and disconnects it during the steady state. Thereby, no power or substantially no power will be dissipated during steady state conditions, other than that attributable to the resistance inherent in the transformer primary winding.

Figure 4:
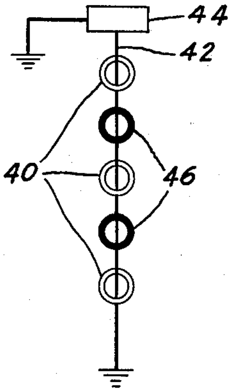
FIGURE 4 is a schematic circuit diagram of a further embodiment of the invention.

Another embodiment of the present invention is shown in FIGURE 4. Once again a plurality of cores 40 are linked by a conductor 42 connected to the current source 44. At intervals along the selecting line special cores 46 may be inserted between the memory cores 40. These cores 46 are formed from a material exhibiting a high eddy current loss factor but otherwise have the same dimensions as the memory cores 40. Such cores for example might be formed from a metallic tape. It is evident that during the application of the current pulses, the transient phenomena associated therewith would cause a high loss due to the eddy currents in the cores 46 and accordingly a rapid damping factor. Once steady state has been reached, no further losses of any substantial magnitude will occur through these special cores 46.

Figure 2:
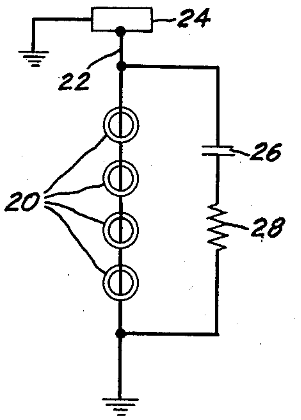
FIGURE 2 is a schematic circuit diagram of another embodiment of the present invention.

In the examples depicted in FIGURES 2–4 inclusive the damping means employed have been responsive only to transients derived from the rise and fall of the current pulse. These damping means are frequency responsive in that the terminating resistor is "seen" by the memory line at proper times occurring at the transient condition resulting from the rate of rise of current. Other arrangements for effectively damping a memory line and yet maintaining no loss at steady state conditions are to be found in FIGURES 5 and 6.

Figure 5:
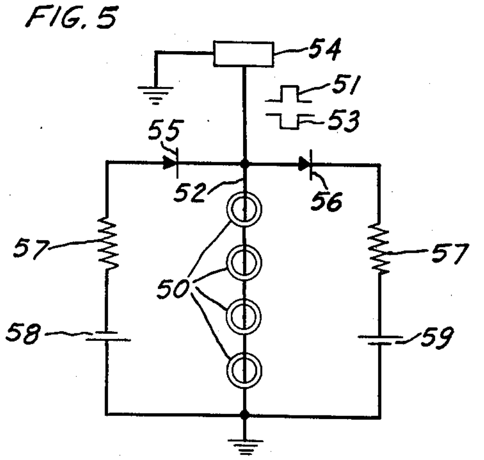
FIGURE 5 is a schematic circuit diagram showing a variation of the apparatus depicted by FIGURES 1 or 1*a*.

In FIGURE 5, a memory line includes a plurality of cores 50 which are linked by a selecting line 52 coupled to a current source 54. A plurality of networks are connected in parallel with the selecting line 52. These networks comprise first and second diodes 55 and 56 connected at the beginning of the line and oppositely poled. Each of these diodes is, in turn, connected to a damping resistor 57 of characteristic impedance. The resistors 57 are connected respectively to terminals of reverse bias sources 58 and 59, the other terminals of which are connected to a common return. It will be noted that two distinct networks are shown in FIGURE 5 each provided with its own terminating resistor 57.

The current source 54 may be one that supplies oppositely directed current pulses adapted to switch the cores in opposite directions. Oscillations due to the transients at the leading and trailing edges of the pulses are damped by the oppositely poled diodes 55 and 56 together with their respective sources of reverse potential 58 and 59. Since none of the embodiments as depicted by FIGURES 1–4 inclusive employ diodes none of them involve orientation to the sense of the current flow, and accordingly, only one damping network is required in each of these earlier embodiments.

In the operation of this circuit, normally both diodes will be biased "off" by their respective bias sources. A high induced voltage (back E.M.F.) at the leading edge of a positive current pulse 51 (due to one or more cores being switched) results in a potential drop across a memory line large enough to make the diode 56 conductive (that is present its negligible forward resistance) and thereby allow the memory line to "see" the associated terminating resistor 57 of characteristic impedance. Thus, the resistor 57 is connected across the memory line to damp reflections. However, once steady state has been reached, the potential drop for the constant current maintained through the memory line is not sufficient to make the diode 56 conduct. Upon termination of the pulse 51, a negative-going induced voltage renders diode 55 conductive to connect terminating resistor 57 across the selecting line 52. In a similar manner diodes 55 and 56 are respectively rendered conductive at the leading and trailing edges of a negative pulse 53. The resistors 57 damp oscillations in a manner similar to that of FIGURES 1 and 1*a*. The circuit of FIGURE 5 has the further advantage of showing substantially no power consumption during steady state due to the high resistance of the diodes 55, 56 when back biased.

Figure 6:
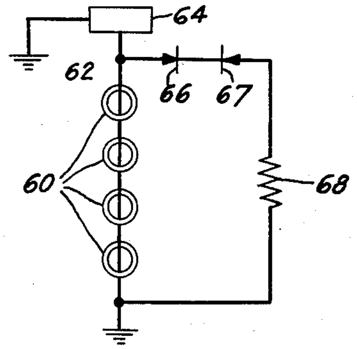
FIGURE 6 is a schematic circuit diagram showing a variation of the invention as depicted in FIGURE 5.

Similar results to the foregoing may be achieved by use of the circuit shown in FIGURE 6. Here again an array comprising a pair of diodes 66, 67 is coupled together and in series with a terminating resistor 68 the array being connected in parallel with the memory line 62 and the current source 64. In this case, the diodes employed are Zener diodes, whereupon it becomes unnecessary to use two separate networks and furthermore the bias source may be omitted. Such diodes conduct in the reverse direction when a critical reverse voltage, the Zener voltage, is applied, and have negligible forward resistance and a high back resistance at less than the Zener voltage. In the reverse direction the operation of the Zener diode is similar to a conventional diode that is reverse biased. By choosing the Zener voltages to be the same as the voltages of the batteries 58, 59, these diodes 66, 67 provide the desired thresholds for the two conditions. Otherwise, the circuit operates in a manner similar to that of FIGURE 5, with diode 67 conducting in the back direction for a positive-going step of current from source 64 and diode 66 conducting for a negative-going step.

An additional advantage of the diode-coupling schemes of FIGURES 5 and 6 are that they result in better current regulation through the memory line. This may be seen from the selecting line circuit of FIGURE 1*a* (which may include hundreds or thousands of cores in practice). The voltage resulting from the back E.M.F. of the cores 10 which are being switched may be variable; that is to say, at one time the current may switch no cores and yet another time current may switch many cores (one core in each of many planes). Then current through the memory line due to the induced voltages flows through the loop of the selecting line 11*a* and resistor 16*a*. The current may vary by $E/R_1$ where E is the maximum back E.M.F. of the cores, and $R_1$ is the resistance of the memory line 11*a* plus the terminating resistor 16*a*.

Consider, however, the embodiment of FIGURE 5 where the diodes 55, 56 are placed in series with the terminating resistors 57. The voltage necessary to make the diode 55 conductive is made greater than the steady state drop across the resistance of the memory line plus the back E.M.F. of one or more cores. Then the current flowing through the memory line will be independent to a substantial extent of the number of cores switched provided that the current source 54 is a perfect one.

A system somewhat similar in its manner of operation to FIGURES 5 or 6 may be obtained through the use of a non-linear resistance means for the terminating resistance element 16*b* of FIGURE 1*b*. Such a resistance means could take the form of a varistor, for example, which is a semi-conductor device having a voltage dependent non-linear resistance. In the use of varistors as the terminating resistors 16*b*, the current I therethrough would increase according to some function such as $I=KI_1V7/2$, with the effective resistance of the varistor at that voltage being substantially equal to the characteristic impedance. Thus the high induced voltage resulting when the current was turned on or off would result in a large current flow through the device and the varistor 16*b* would damp the array. During return to steady state conditions current flow through the device would fall off rapidly becoming negligible at steady state.

As may be seen from the foregoing, various means have been provided for preventing overshoots of current in the switching lines of magnetic core memories.

All of the various embodiments provide a terminating resistor for a switching line which will achieve smooth damping of the line, coupled with minimum power consumption during steady state conditions. Some embodiments provide means for eliminating all power consumption during steady state. It is likely that other variations will suggest themselves to those skilled in the art, and all such variations are meant to fail within the scope of the appended claims.

Having thus described the invention, what is claimed is:

1. In a magnetic core memory array, a plurality of magnetic memory cores, at least one conductor linking said cores and exhibiting a characteristic empedance, energization means coupled to said conductor for applying thereto current pulses whereby current reflections tend to occur in said conductor, and absorbing means connected in parallel with said conductor and said energization means for absorbing said current reflections.

2. The magnetic core memory array of claim 1 in which said absorbing means comprises a resistance means the resistance of which is high relative to that of the conductor linking the memory cores so that relatively little current is supplied to said resistance means from said energization means.

3. The magnetic core memory array of claim 1 in which said absorbing means comprises a resistor the resistance of which is substantially equal to the characteristic impedance of said linking conductor.

4. The magnetic core memory array of claim 1 in which said absorbing means comprises a resistance means and a capacitance means connected in series, whereby said absorbing means absorbs power only during changes in current.

5. A magnetic core memory array comprising a plurality of magnetic cores, a conductor linking said cores thereby to form a memory line exhibiting a characteristic impedance, a source of energization coupled to said conductor to energize said cores, and a resistor having resistance substantially equal to the characteristic impedance of said memory line connected in parallel with said memory line.

6. In a magnetic core memory array, a plurality of magnetic memory cores, at least one conductor linking said cores and exhibiting a characteristic impedance, energization means coupled to said conductor for applying thereto current pulses whereby current reflections tend to occur in said conductor, and means for absorbing said reflections comprising a resistor and capacitor connected in series to form a network, said network being connected in parallel with said conductor thereby to absorb current during the current rise periods of said energization means.

7. A magnetic core memory array comprising a plurality of magnetic cores exhibiting first and second states of magnetization, first switching lines linking said cores in a first orientation, second switching lines linking said cores in a second orientation, so that each core is linked by one of each of said first and second switching lines, a plurality of means for selectively supplying current coupled respectively to said switching lines, each of said current supplying means being adapted to supply to its respective switching line a fraction only of the current required to switch the cores linked by said line from their first to their second state of magnetization so that, in order to switch a selected core, current must be supplied to the plurality of switching lines linking said selected core, and a separate impedance means connected in parallel with each switching line and in parallel with the associated current source and having an impedance equal to the characteristic impedance of the associated switching line.

8. A magnetic core memory array comprising a plurality of magnetic cores exhibiting first and second states of magnetization, first switching conductors linking said cores along a plurality of rows, second switching conductors linking said cores along a plurality of columns, so that each core is linked by one of each of said row and column switching conductors, a plurality of sources of current, a plurality of resistors coupling said sources to first terminals of respective ones of said switching conductors, said resistors exhibiting high impedance relative to said conductors so that said sources may furnish substantially constant current to said switching conductors, a plurality of transistors having an electrode thereof coupled respectively to second terminals of said switching conductors thereby to connect selectively said current sources to said switching conductors, signal means coupled to other electrodes of said transistors to render said transistors selectively operative, each current source supplying to its respective conductor a fraction only of the current required to switch the cores linked by said conductor from their first to their second state of magnetization so that in order to switch a selected core current must be supplied to the row and column switching conductor linking said core, and a separate resistor having a resistance equal to the characteristic impedance of said switching conductors connected between said first and second terminals of each switching conductor.

9. A magnetic core array comprising a plurality of magnetic cores exhibiting first and second states of magnetization, first switching conductors linking said cores along a plurality or rows, second switching conductors linking said cores along a plurality of columns so that each core is linked by one of each of said row and column switching conductors, a plurality of current sources, a plurality of current sinks, each of said current sources connected to first terminals of respective ones of said switching conductors, each of said current sinks connected to second terminals of respective ones of said switching conductors, each said current source selectively supplying to its respective conductor a fraction only of the current required to switch the cores linked by said conductor from the first to the second state of magnetization so that in order to switch a selected core current must be supplied to the row and column switching conductor linking said core, and separate impedance means having an impedance equal to the characteristic impedance of said switching conductors connected between said first and second terminals of each switching conductor.

10. A magnetic core array comprising a plurality of magnetic cores, first and second switching conductors linking each of said cores along a plurality of rows and columns, a plurality of current sources, a plurality of current sinks, each of said current sources connected to first terminals of respective ones of said switching conductors, each of said current sinks connected to said second terminals of respective ones of said switching conductors, and a separate impedance having an impedance equal to the characteristic impedance of said switching conductors connected between said first and second terminals of each switching conductor.

11. A magnetic core memory array comprising a plurality of magnetic cores, a conductor linking said cores thereby to form a memory line exhibiting a characteristic impedance, a source of energization coupled to said conductor to energize said cores, and impedance means connected in parallel with said memory line, said impedance means exhibiting an impedance substantially equal to the characteristic impedance of said memory line.

12. In combination, a plurality of magnetic cores, a conductor linking said cores and exhibiting a characteristic impedance, and impedance means having an impedance substantially similar to the characteristic impedance exhibited by said conductor, said impedance means being connected in parallel with said conductor.

13. In a magnetic core memory array, a plurality of magnetic memory cores, at least one conductor linking said cores and exhibiting a characteristic impedance, energization means coupled to said conductor for applying thereto current pulses which may produce current reflections in said conductor, and power absorbing means coupled in parallel with said conductor and having a characteristic impedance equal to that of said conductor, said power absorbing means responsive only during the rise and fall time of said current pulses in said conductor for absorbing said current reflections.

14. The combination recited in claim 12 wherein said impedance means comprises resistor means and capacitor means connected in series.

15. The combination recited in claim 12 wherein said impedance means comprises resistor means and diode means connected in series.

16. The combination recited in claim 12 wherein said impedance means comprises a plurality of network means, each of said network means including diode means, resistance means and biasing means.

17. The combination recited in claim 12 wherein said impedance means comprises a plurality of network means, each of said network means including diode means, resistance means and biasing means, each of said diode biasing means and said plurality of network means being biased in opposite directions and to different conditions.

18. The combination recited in claim 12 wherein said impedance means comprises a pair of zener diodes oppositely connected.

19. The combination recited in claim 12 wherein said impedance comprises a non-linear impedance means.

References Cited in the file of this patent

UNITED STATES PATENTS

| | | |
|---|---|---|
| 1,567,316 | Buckley | Dec. 29, 1925 |
| 1,826,737 | Connery et al. | Oct. 13, 1931 |
| 2,900,624 | Stuart-Williams et al. | Aug. 18, 1959 |
| 2,908,893 | Rosenberg | Oct. 13, 1959 |
| 2,939,119 | Einsele | May 31, 1960 |
| 3,007,141 | Rising et al. | Oct. 31, 1961 |

FOREIGN PATENTS

| | | |
|---|---|---|
| 1,170,714 | France | Jan. 16, 1959 |
| 546,402 | Italy | Apr. 30, 1952 |